United States Patent
Scarborough et al.

[11] 3,863,508
[45] Feb. 4, 1975

[54] ACCELEROMETER

[75] Inventors: William M. Scarborough, Whittier; Doyle E. Wilcox, La Puente, both of Calif.

[73] Assignee: Rockwell International Corporation, El Segundo, Calif.

[22] Filed: Jan. 2, 1959

[21] Appl. No.: 784,819

[52] U.S. Cl. .............................. 73/516 R, 73/517 B
[51] Int. Cl. .......................................... G01p 15/08
[58] Field of Search .... 264/1 MB, 1 AL; 33/204.15; 324/70; 73/516, 503, 497, 504

[56] References Cited
UNITED STATES PATENTS

| | | | |
|---|---|---|---|
| 2,591,921 | 4/1952 | Cosgriff et al. | 264/1 |
| 2,797,912 | 7/1957 | Trostler | 264/1 |
| 2,840,366 | 6/1958 | Wing | 264/1 |
| 2,933,298 | 4/1960 | Allison | 73/503 |
| 2,943,493 | 7/1960 | Ten Bosch et al. | 73/516 |
| 2,973,647 | 3/1961 | Smith et al. | 73/497 |

*Primary Examiner*—Robert F. Stahl
*Attorney, Agent, or Firm*—L. Lee Humphries; H. Frederick Hamann; Rolf M. Pitts

EXEMPLARY CLAIM

1. In an integrating type of device for measuring accelerations, the combination of: a housing a cylindrical proof mass of non-magnetic, electrically conductive material; said bearing means positioned in close proximity to the surface of said proof mass; frictionless translation of said proof mass parallel to the cylindrical axis thereof, while restraining movement of said proof mass transversely of said axis positioned within and longitudinally with respect to said housing; bearing means, positioned in said housing for permitting means mounted on said housing adjacent one end of said proofmass, for sensing axial displacements due to accelerations of said proof mass; means for restoring said mass to null position after axial displacement, comprising setting up magnetic fields travelling axially of said proof mass for means for inducing currents in said proof mass in such a direction as to produce magnetomotive restoring axial forces equal and opposite to those producing such translations, said restoring means comprising a pair of magnets mounted on said housing with their opposed poles adjacent the outer surface of said proof mass; and means for measuring the restoring forces necessary to balance the axial forces due to said accelerations as a function of the speed and number of revolutions of said rotating magnetic means for producing said induced currents.

19 Claims, 13 Drawing Figures

PATENTED FEB 4 1975

INVENTORS
WILLIAM M. SCARBOROUGH
DOYLE E. WILCOX

BY

ATTORNEY

PATENTED FEB 4 1975

INVENTORS
WILLIAM M. SCARBOROUGH
DOYLE E. WILCOX

BY

ATTORNEY

INVENTORS
WILLIAM M. SCARBOROUGH
DOYLE E. WILCOX

ATTORNEY

INVENTORS
WILLIAM M. SCARBOROUGH
DOYLE E. WILCOX

ATTORNEY

ACCELEROMETER

This invention relates to devices for measuring acceleration, and particularly to an integrating type of device in which the restoring force for the proof mess is set up by the use of measurable magnetic fields.

Devices for inertial navigation are well known in which acceleration force components acting along three mutually perpendicular axes are obtained in order to compute the present course and heading of the device on which the accelerometer is carried. The course and heading computations may be carried out by known types of computers, using as inputs the accelerations experienced, which may be integrated once to obtain the velocity along a particular axis, and twice to obtain the distance traveled as a function of time along that axis. When these factors are properly combined by a computer, the distance and direction in which the device is traveling may be plotted, and any desired navigational problems solved accurately. This may be done without the necessity of referring to external means, such as star observations or radio fixes, in order to ascertain exactly the position of the device at any particular instant, and to predict its probably course for a subsequent period.

Since travel over any substantial distance involves movement in a curved path around the earth's center, the flight path computed by inertial means must of necessity take account of motion along such a curved path, even though the vehicle is pursuing a horizontal course in a fixed direction parallel to the earth's surface. This requires that the computations be made for movement along three mutually perpendicular axes in order to provide for accurate navigation.

In brief, the preferred embodiment of the invention hereinafter described utilizes as the means for sensing accelerations an integrating accelerometer having a cylindrical proof mass supported on anti-friction bearings and constrained for movement of both translational and rotational character relative to a single axis, its axis of symmetry. The axial position is servo-controlled by means preferably including inter-acting magnetic fields, while the currents producing the magnetic fields necessary to restore the proof mass to null provide a measure of the accelerating forces. Alternatively, mechanical force interaction may be employed in conjunction with magnetic field forces.

The present invention utilises an improved form of integrating accelerometer, or device for measuring and integrating acceleration along a single axis. It is intended that a plurality of similar elements may be used together in order to obtain values accurate for movement in a three dimensional frame of reference. These elements may be mounted on a gyro-stabilized platform which will maintain the proper axial orientation in a co-ordinate system involving three mutually perpendicular axes. The output may be in the form of a shaft rotation angle, which may be used to drive a potentiometer, a resolver or other analog type transducer; or may be in the form of a series of electric pulses, for example, the number of which would be a measure of velocity.

It is a primary object of the invention to provide an improvement in integrating type devices responsive to accelerating forces.

Another object is to provide an acceleration-responsive device in which the proof mass is capable of both rotation and translation and in which a direct proportionality may exist between the rotational torque and the translational forces.

It is another object of the invention to eliminate cross-coupling in acceleration-responsive devices.

A further object of the invention is to achieve simplicity in construction.

Still another object is to produce an instrument of extremely small size and weight.

Another object is to provide a device having very low power requirements.

A further object is to provide an accelerometer in which the translational displacement may be balanced by measurable forces due to the creation of eddy currents within the proof mass.

Yet another object of the invention is to provide an accelerometer having a proof mass physically separated from a supporting structure by means of anti-friction bearings, and having all coercive forces due to connecting leads eliminated.

These and other objects may be better understood by reference to the accompanying drawings, in which.

The embodiments shown in FIGS. 1-13 have as a common characteristic the fact that the proof mass is capable of both rotation and translation, and means are provided such that a direct proportionality exists between the rotational torque and the translational force, which is equal to the accelerating force to which the device is subjected. In each of the forms shown in FIGS. 1-11, the proof mass is a cylindrical conducting element in which eddy currents are induced by controlled relative motion with the field of a permanent magnet. The proof mass itself is floated in a pressure-fed bearing in such a manner as to allow frictionless translation parallel to the axis thereof in response to an axial component of acceleration. The sensing and measurement of acceleration is accomplished by establishing a magnetic field of constant intensity passing through the proof mass, and servo controlling the relative velocity between the magnetic field and the proof body in such a manner that the inertial force resulting from the acceleration to which the proof body is subjected is balanced by the forces resulting from eddy currents induced in the proof mass.

In each of these embodiments, the magnet and the servo motor which provide the induction forces are fixed to the base of the instrument. In the embodiment shown in FIG. 1, the accelerometer unit generally is indicated as 1. Within the housing 1 is mounted the hollow cylindrical proof mass 2. The proof mass 2 is disposed within a proof mass chamber 3 in fluid containing member 4, which is sealed to retain fluid 5 directly in contact with and supporting the proof mass 2. The chambered fluid container 4 is mounted for rotation in anti-friction bearings 6 and 7, which permit it to revolve freely relative to the accelerometer 1. The internal diameter of the portion of container 4 constituting chamber 3 is only a few ten-thousandths of an inch greater than the external diameter of proof mass 2, so that the latter is constrained against displacements normal to its axis of rotation. The chamber 3 is, however, sufficiently longer to permit axial movement of the proof mass therewithin in response to accelerations. The fluid 5 performs a double function, in that it provides anti-friction support substantially uniform along the length of the proof mass and permits the axial movement thereof with a damping action. The damping effect is due to the restricted passage for movement of the fluid from one end of chamber 3 to the other, since the only path available is the very small annular passage about the proof mass.

Figure 1:
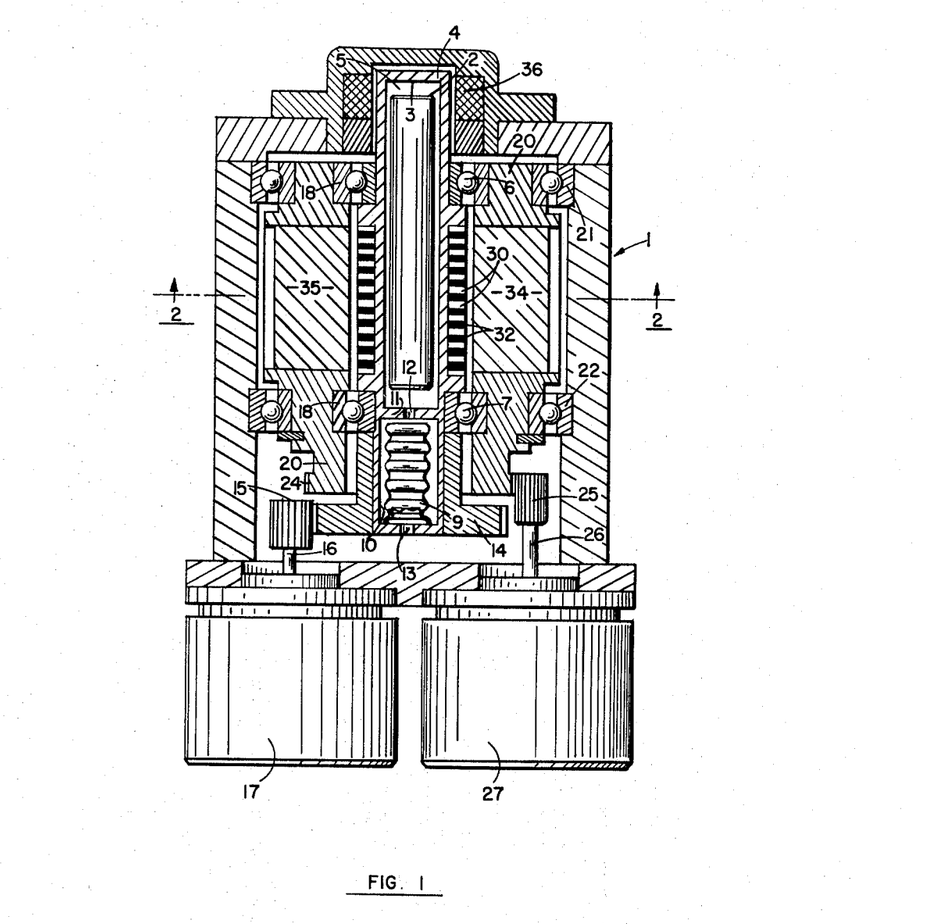
FIG. 1 is a schematic sectional view showing a preferred form of the invention as incorporated in an integrating accelerometer.
Figures 2, 3:
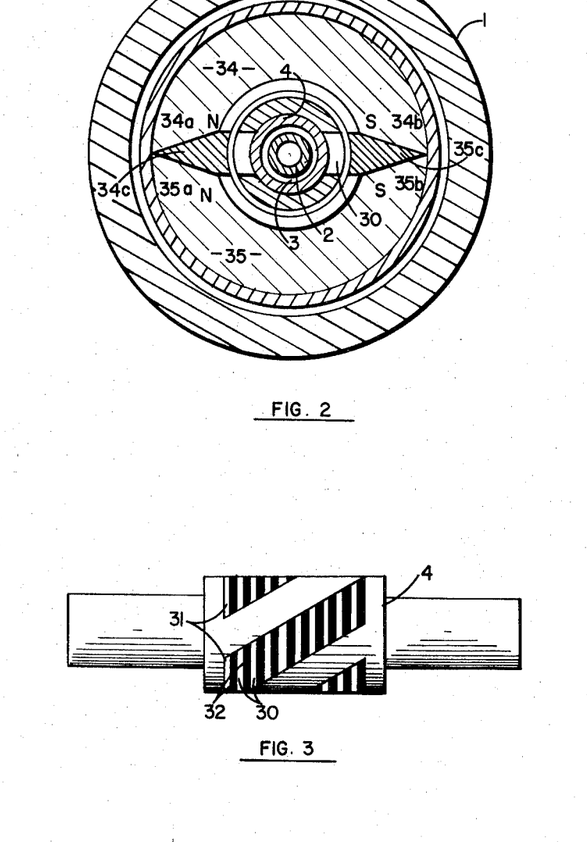
FIG. 2 is a schematic sectional view of the embodiment of FIG. 1, taken as indicated by line 2—2 in that Figure.
FIG. 3 is a schematic showing of the magnetic flux distributor assembly incorporated in the embodiment of FIG. 1.
Figure 4:
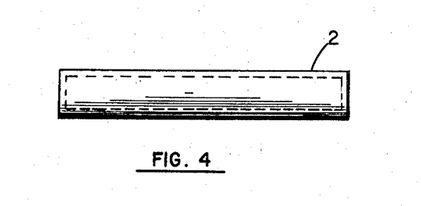
FIG. 4 is a side view illustrating the proof mass utilized with the embodiment of FIG. 1.

Temperature compensation means for the fluid are provided by mounting a variable volume member, such as Sylphon bellows 9, within a compensation chamber 10 separated from the remainder of the chamber 3 by an apertured diaphragm 11. As the temperature rises and fluid 5 expands, a portion thereof will be forced out through the port 12 in apertured diaphragm 11 into the compensation chamber 10 surrounding the Sylphon bellows 9, thereby comprising the bellows. The Sylphon bellows 9 is arranged internally for communication with the surrounding atmosphere through a compensation port 13, and will contract just enough to allow compensation chamber 10 receive the fluid forced out of chamber 3 and thus maintain the pressure balance therein. When the temperature drops so that the unit volume of fluid 5 is reduced, the bellows 9 will expand and force some of the fluid 5 out of compensation chamber 10 through port 12 into that portion of the chamber 3 in which the proof mass 2 is mounted. A gear member 14 is formed about that portion of member 4 containing the Sylphon bellows 9, and is driven by means such as a driving gear 15 mounted on the shaft 16 of a motor 17 fixed to the accelerometer. The outer recess 18 of bearings 6 and 7 are, in turn, mounted in a cylindrical body 20 which surrounds the container 4. Near each end of the cylindrical body 20 and concentrically about the axis of proof mass 2 there are disposed end bearings 21 and 22, circumferentially mounted in the housing of accelerometer 1. Thus, the cylindrical body 20 may rotate freely within the body of the accelerometer 1, while the member container 4 may rotate freely within and independently of the cylindrical body 20. At the same time, the proof mass 2 is enabled to move either rotationally or in translation within chamber 3, and independently of members 4 and 20.

The cylindrical body 20 has formed at the lower end thereof and concentrically about its axis of rotation, a gear member 24, and which meshes a driving pinion 25. Pinion 25 is driven through a shaft 26 by a motor 27 suitably secured to the housing of the accelerometer 1. The container member 4 has disposed about the central portion thereof in a double helical array a plurality of magnetically permeable segments 30. The segments 30 are stacked in the double helical array 31, which may be seen to better advantage in FIG. 3, alternately with non-magnetic spacers 32. When the member 4 is rotated in the presence of a transverse magnetic field, the array 31 will produce a flux wave traveling axially of the proof mass.

Within the cylindrical body 20, and coaxially about the proof mass

Within the cylindrical body 20, and coaxially about the proof mass 2 and flux distributing double helical array 31, are disposed two semi-cylindrical or tubular magnets 34 and 35. The semi-cylindrical or tubular magnets 34 and 35 are so disposed that their north poles, 34a and 35a respectively, are adjacent, and their sourth poles, 34b and 35b, are likewise adjacent. The adjacent north pole portions, 34a and 35a, and the adjacent south pole portions, 34b and 35b, define gaps which are filled by soft iron pole pieces 34c and 35c. The pole pieces 34c and 35c extend radially within the annular surface defining the inner boundaries of the magnets 34 and 35 to provide a shortened gap between these pole pieces and the magnetically permeable segments 30 fixed around the container 4. A magnetic field is set up through the member 4 and the proof mass 2 by the permanent magnets 34 and 35: this field rotates as the permanent magnets are made to rotate and travels axially of the proof mass 2 as the helical array 31 rotates, inducing eddy currents which, by the well-known laws of magnetic reaction, will produce an axial translating force on the proof mass 2. Thus, the movement of the proof mass axially of its housing due to accelerations experienced in flight may be opposed by forces due to currents created by the fields set up therein by the permanent magnets and by the rotating helical array. The amount of opposing force necessary to prevent the proof mass from translational movement in response to the accelerations along the translational axis, or to restore it to null position if displaced, may be measured by the restoring force necessary. This, in turn, is measured by the total number of revolutions of the motors 17 and 27 necessary to restore the proof mass to null position.

Conventional servo circuit arrangements will be used to control the speed at which motors 17 and 27 operate and to record or measure the number of revolutions required to balance the accelerations experienced by restoring the proof mass to null.

The speed at which the motors 17 and 27 are driven will depend on the actuation supplied by a servo circuit similar to those which will be discussed in connection with later figures. The initiation of operation in the servo circuit may occur through changes in the field of a tuned pick-off member 36 disposed about the upper end of member 4.

As the proof mass 2 is displaced axially, the magnetic field of the tuned pickoff member 36 will be altered. By the use of suitable phase sensitive sensing circuits, the operation of the servo circuit may be initiated. This may have the form of varying the speed of rotation of motor 17, motor 27 or of both, depending on the particular conditions.

Under zero acceleration conditions, the magnet assembly would rotate at the same speed and in the same direction as the flux distributing helical array 31. When an acceleration appears, the relative rotational speed must change to produce a balance force to the proof mass. Thus, output = $\dot{\theta}_1 - \dot{\theta}_2 \sim$ acceleration or $\theta_1 - \theta_2 \sim$ velocity. That is, the displacement angle between the magnet assembly and the flux distributing helical array is proportional to the velocity of the missile. (Assuming spin axis is maintained level in line of flight.) The rotational speed of either the magnet assembly or the flux distributing helical array may be held constant while the other is varied, or both may be varied oppositely for quicker response. The two rotating elements are driven by synchronous motors or other controlled speed devices, such as a differential gear system.

Figure 5:
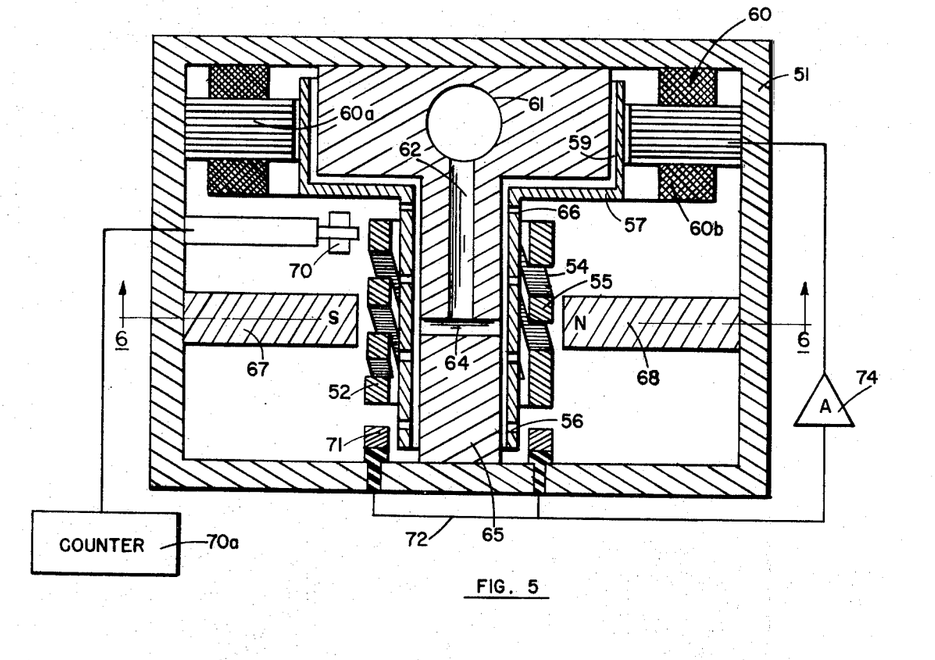
FIG. 5 is a schematic sectional view of another preferred embodiment of the invention, with associated circuitry.
Figure 6:
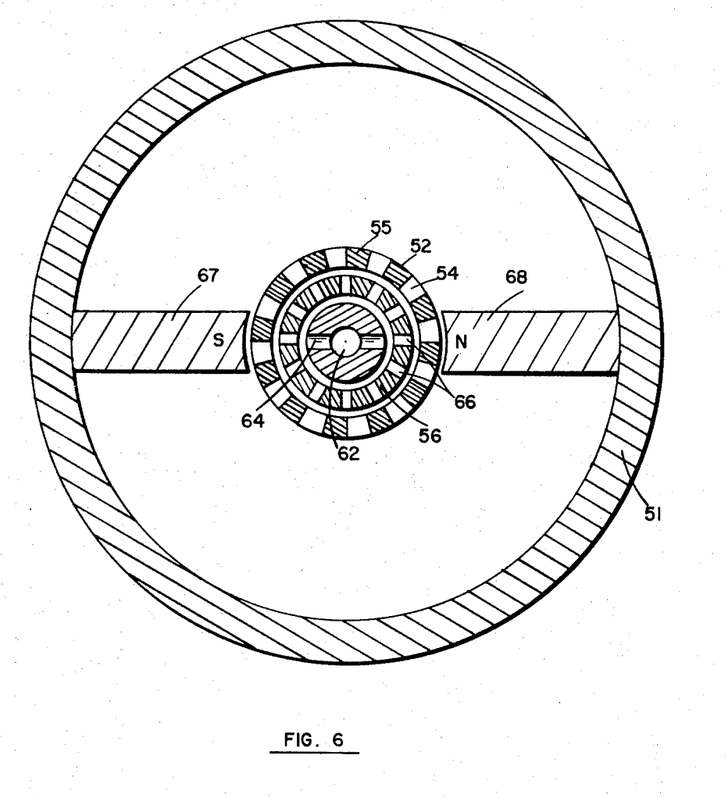
FIG. 6 is a sectional view of the embodiment of FIG. 5, taken as indicated by line 6—6 in that Figure.

Another preferred embodiment of the invention is shown in FIG. 5 in a schematic sectional side view. A sectional view normal to the rotational axis of the proof mass is shown in FIG. 6, and a detail view of the proof mass is shown in elevation in FIG. 7. In this embodiment, a sealed housing 51 encloses therewithin the proof mass 52, which here has the form of a cylindrical body 53 formed of magnesium or other nonmagnetic material, with the cylindrical wall pierced to define skewed slots 54 separating a plurality of skewed conductor bars 55. It will be understood that the space between these bars may be filled with non-magnetic material, such as potting compound, omitted from the figure for clarity in illustration. The proof mass is mounted coaxially about a pressure-fed bearing member 56, at the upper end of which is formed a thinwalled cup 57. The cup 57 includes a cylindrical wall 59 which constitutes an induction motor rotor. Mounted fixedly within the housing 51 and concentrically with the bearing member 56 is an annular stator 60 having a conventional core portion 60a and windings 60b and arranged to cooperate with the thin cylindrical wall rotor 59 to produce rotary motion of the pressure-fed bearing member 56 under control of the servo circuit to be described hereafter. Lubricating fluid is delivered to bearing member 56 by conventional means such as a pump 61 which may be disposed within the rotor 59 and arranged to deliver fluid 5 under pressure to the bearing through means such as an axial conduit 62 in the form of a "T" having transverse passages 64.

Fluid is thus transmitted from the pump 61 to the space surrounding the shaft 65 which is the bearing surface about which the bearing 56 is rotatably mounted. In order to assist in the continuous flow of the lubricant, ports 66 may be formed through the walls of the bearing member 56. In consequence, when rotor 59 is caused to revolve by current applied to the windings of stator 60, an anti-friction or hydrodynamic bearing surface is set up within the bearing 56, the fluid from which is additionally communicated through the ports 66 to the bearing space surrounding the member 56 and within the proof mass 52, slots 54 being potted to make the proof mass a complete cylindrical enclosure.

A constant transverse magnetic field is set up through the proof mass 52, the sleeve bearing 56 and the shaft portion 65 by permanent magnets 67 and 68 fixed within the housing 51.

The speed of rotation of the proof mass 52 may be counted by using a pickup unit 70 disposed adjacent one end of the proof mass and arranged to be influenced by the field changes due to the successive passages adjacent thereto of the slots 54 and bars 55. The pulses so picked up may be amplified and counted by a conventional counter circuit 70a. At the opposite end of the proof mass 52 is disposed a pickup or sensing means 71 arranged to respond to the translational movement of the proof mass. The pickup means 71 are connected through suitable leads 72 to a servo unit and amplifier 74 which controls the current supplied to the induction motor stator 60 windings, and is arranged to urge the proof mass toward a null position axially upon any displacement therefrom.

It will be seen that as the proof mass rotates, it may be inertially deflected through the field of magnets 67 and 68. Currents will be induced in the conductor bars 55 in such a direction as to subject the proof mass to restoring forces. The proof mass will be continuously nulled, or restored to its original position axially by translational forces induced by currents in the skewed proof mass conductors. These currents will be induced as the proof mass is rotated by viscous frictional drag due to rotation of bearing member 56 by the servo circuit 74.

Another preferred embodiment of the invention is illustrated in FIGS. 8 through 11. Here the axially-traveling magnetic wave which induces the restoring force in the proof mass is set up by using a helically-formed member rotated by motor means at a speed which is under the control of the servo system. The reference number 101 denotes the velocity meter housing generally, to which is attached the motor 102. The shaft 104 of motor 102 has formed thereon a magnetic flux distributor 105 having the form of a double helix. The magnetic flux distributor 105 is enclosed by means such as a thin-walled cylindrical housing 106 forming an air space therewithin. About the cylindrical housing 106 is disposed concentrically a cylindrical proof mass 107 of very slightly greater inside diameter then the outside diameter of the housing 106. In turn, the proof mass is surrounded by magnetic members 109 and 110 which are skewed to provide a helical magnetic field about the flux distributor 105. The north and south pole faces of the magnetic members 109 and 110 are terminated by soft iron pole shoes 111 and 112 which extend close to the surface of the proof mass 107 and are separated therefrom by fluid 114 under pressure. The fluid 114 is free to communicate about the ends only of the proof mass with both the inner and outer surfaces thereof.

Figure 8:
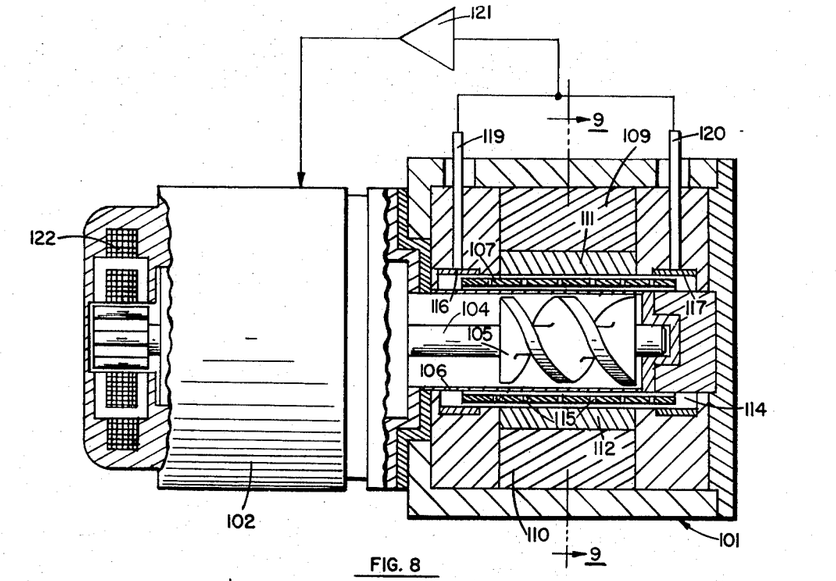
FIG. 8 is a schematic sectional view, together with associated circuitry, of another preferred embodiment of the invention in which an axially traveling magnetic field is created by a helical magnetic flux distributor.
Figure 9:
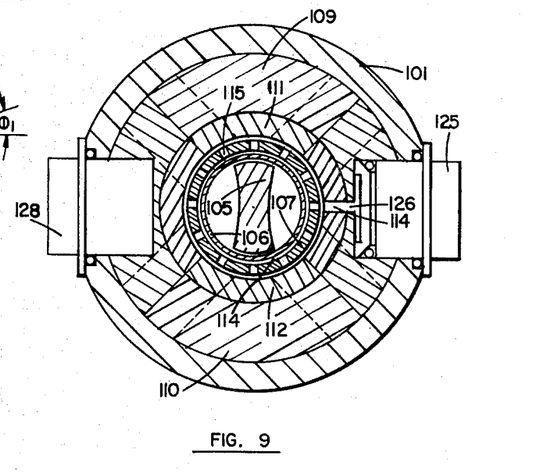
FIG. 9 is a sectional view of the embodiment of FIG. 8, taken as indicated by the line 9—9 in that Figure.

In this embodiment, the fluid 114 for the bearing is supplied by a fluid pump 125 through a port 126. A fluid expansion chamber having temperature control means is provided at 128. The bearing fluid acts externally of the proof mass to afford a substantially frictionless bearing surface on which the proof mass may translate freely along the sensing axis, or rotate while being restrained against displacement normal to the sensing axis. The proof mass is supported by the bearing for rotation, but the speed of rotation will normally be small. Annular sensing members 116 and 117 are disposed terminally of the proof mass and are connected through appropriate leads 119 and 120 to a servo circuit 121 which, in turn, controls the speed at which the motor 102 rotates. Rotation of the member 105 sets up an axially traveling flux wave which in turn induces eddy currents in the proof mass 107 which tend to restore the latter axially to a null position after any displacement therefrom. The number of rotations of the motor 102 may be measured by the use of an angle resolver pickoff 122 associated with the motor 102. Conventional means, not shown in the Figures, are provided to maintain the temperature of the entire unit, including the motor and the flux distributor within plus or minus 0.2°C at least in order that the accuracy of measurement may not be disturbed by temperature variations.

Figure 10:
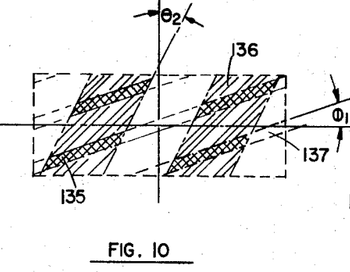
FIG. 10 is a developed view showing the relations between the fields of the magnetic flux distributor and the magnetic pole pieces of the embodiment of FIGS. 8 and 9.

The flux pattern set up by the rotation of flux distributor 105 and its interacting field from the magnets 109 and 110 and pole shoes 111 and 112 has been developed and laid out on a flat surface as shown in FIG. 10 in order to explain the way in which the device operates. It will be apparent that at the confluence 135 of the flux concentrations 136 due to the permanent magnetic field with those flux concentrations 137 due to the effect of the helical member 105, traveling waves of increased magnetic flux density will be set up in the proof mass 107. These traveling waves of flux concentration will create a thrust parallel to the shaft 104 of the motor and flux distributor so that the proof mass will be urged back to a null position under the control of the servo circuit 121 after any trial translation. The combination of thrusts acting due to the flux pattern of FIG. 10 is illustrated in the vector diagram of FIG. 11, where it will be seen that the sum of the fluxes due to the two sources discussed above produces a restoring force on the proof mass along the translational axis.

The operation of the integrating accelerometer or velocity meter when an acceleration is applied along the axis of the bearing may also be analyzed as follows: the acceleration component in the direction of the axis causes the proof body to slide in response to the inertial force $$F = M'A \qquad (1)$$

where $A$ is the acceleration and $M'$ is the net mass which may be defined as the difference between the mass of the proof mass and the mass of the liquid displaced by the proof mass. The pickoff will develop an electrical signal in proportion to the motion of the proof body, which is fed to the servo amplifier. The amplifier will excite the induction motor stator, causing the rotor and the bearing sleeve to spin. The spinning sleeve will cause the proof body to spin by viscous coupling through the liquid which fills the gap between them.

The permanent magnets set up a magnetic field which passes through the proof body sleeve and the sleeve of the bearing, which is of ferro-magnetic material. Hence, as the proof body is rotated by means of viscous coupling from the motor rotor, eddy currents are induced in the skewed conductor bars of the proof body. Now these currents have a magnitude proportional to the rotational speed, $\omega$, of the proof body and to the intensity, $B$, of the magnetic field. The resultant force due to these currents is orthogonal to the conductor bars and the radial magnetic field. Hence, there is exerted on the proof mass an axial force having a magnitude expressed by the equation $$F = (KB^2 \omega \sin 2\theta)/r \qquad (2)$$

where $B$ = intensity of the magnetic field through the proof mass.
$\omega$ = angular velocity of the proof mass.
$\theta$ = angle of skew of the slots in the proof mass.
$r$ = resistivity of the metal composing the proof mass.
$K$ = constant involving geometrical and electromagnetic factors.

In the steady state the force necessary to accelerate the proof body at the same inertial value as the instrument is the electromagnetic force applied by the servo loop which spins the proof body in the magnetic field. Hence, if the net mass of the proof body in the liquid is $M'$ then the steady state equation is $$M'A = (K B^2 \omega \sin 2\theta)/r \qquad (3)$$

$$\omega = (M' r A)/(K B^2 \sin 2\theta) \qquad (4)$$

The integral of this equation is the total angular travel of the proof body which is a measure of the integral of acceleration, or velocity.

$$\phi = \int_t \omega dt = (M_2' r)/(K B^2 \sin 2\theta) \int_t A dt \qquad (5)$$

$$\phi = K'V \qquad (6)$$

The angular travel of the proof mass is indicated by the rotation counter 70, which consists of an iron-core coil whose poles are placed adjacent to the slots in the proof mass. The passage of the slots under the poles of the rotation counter will modulate the inductance of the coil. As the coil is fed with a high frequency carrier current, the voltage across the coil is modulated by the passage of the slots in the proof mass. This carrier current may be amplified and demodulated to give a voltage wave or pulse as each slot passes under the counter coil, thereby giving a remote indication of the integral of acceleration.

Figure 7:
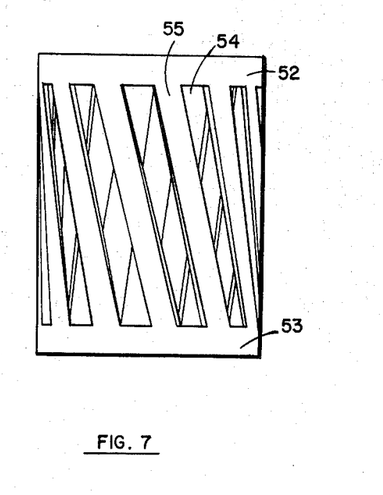
FIG. 7 is a side elevational view of an improved proof mass incorporated in the embodiment of FIG. 5, shown before filling the slots.

The schematic drawing of FIGS. 5-7 shows only one way by which the induction sleeve may be floated and driven. There are many other possible configurations of motor and pump which will accomplish this objective.

Figure 12:
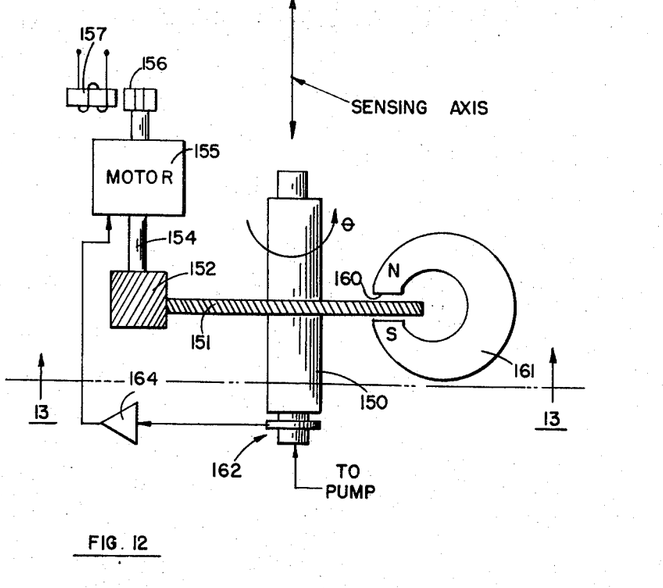
FIG. 12 is a schematic side view of another preferred embodiment, together with associated circuitry.
Figure 13:
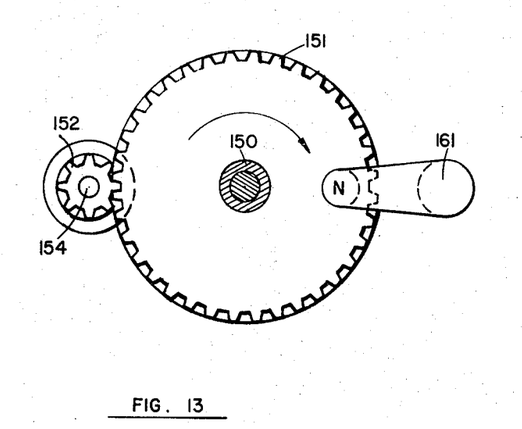
FIG. 13 is a schematic top view of the embodiment illustrated in FIG. 12.

Still another embodiment of the invention is illustrated in FIGS. 12 and 13. In the form shown in these Figures, the proportionality between rotational torque and translational force is obtained mechanically by means of the inter-action of helical gear teeth. Here the proof mass 150 has the form of a rotatable cylinder about which is fixed a helical gear 151 meshing with a helical pinion 152. The pinion 152 is mounted on the shaft 154 of a motor 155 which also carries magnetic sensing means 156 cooperating with a magnetic pickup member 157 to furnish an output through to suitable counting equipment, not shown. The helical gear 151 rotates in a gap 160 formed in a C-shaped drag magnet 161. The gear 151 thus acts as an induction drag disk, producing a torque load proportional to the rotational speed of the disk. The sensing axis of this embodiment is parallel to the axis of rotation of the floated proof mass. Capacitor pickoff means 162 are utilized to control the operation of a servo circuit, indicated generally as 164 which operates through the motor 155 to drive the helical pinion 152 and drag disc gear 151. The speed of rotation will be roughly proportional to the displacement of the proof mass 150 from the null, or zero acceleration, position. In this embodiment, the axial restoring force acting to null the proof mass 150 is effective because of the angular contact line between the engaging portions of the teeth of the helical gears 151 and 152. The rotational torque on the disc due to the drag magnet is $$L = K_m \dot{\theta}$$

(7)

This drag torque must be applied by a tangential force $F_1$ supplied to the gear teeth of the induction disc by the motor drive gear. Hence, $$F_1 = L/R_1 = (K_m/R_1) \dot{\theta}$$

(8)

where $R_1$ is the radius of the induction disc. Now the tangential force $F_1$ results in a thrust or translational force $F_2$, $$F_2 = F_1 \tan \alpha$$

(9)

where $\alpha$ is the helix angle between the gear teeth and the gear axis. The servo controller balances the thrust force $F_2$ against the acceleration force, giving the relationship $$M'A = F_2 = (K_m \dot{\theta} \tan \alpha)/R_1$$

(10)

where $M'$ is the net mass and A is the acceleration component along the sensing axis. Hence, $$\dot{\theta} = PR_1 A/K_m \tan \alpha$$

(11)

The total angle $\theta$ registered by the output revolution counter 155 is $$\theta = PR_1/(K_m \tan \alpha) \int_t A dt = PR_1/(K_m \tan \alpha) V$$

(12)

If the gear ratio between the motor and disc gear is n, then the angle through which the motor turns, $\theta_m$, is also a measure of velocity:

$$\theta_m = n\theta = (PR_1 n)/(K_m \tan \alpha) V$$

(13)

Returning again to the embodiment of FIGS. 8–11, the traveling flux wave, which is due to the axial motion of the high intensity regions of the magnetic field opposite the surfaces of the screw threads, induces eddy currents in the conductive proof body which are in such a direction as to cause an axial drag force on the proof body proportional to the speed of rotation of the screw. Hence, if the axial speed of the screw is $\dot{\theta}$, the axial force on the proof is given by the equation, $$F = K_m \dot{\theta}$$

(14)

Now, by means of the position pickoffs 116 and 117 which sense any displacement of the proof body in the axial direction, and the controller amplifier 121 which powers the servo motor 102, the speed of the screw is controlled by the axial displacement of the proof body. Hence, a force balance is established between the input force, $M'A$, on the proof mass due to axial acceleration and the induced drag force F. Therefore, $$M'A = K_m \dot{\theta}$$

(15)

or $$\dot{\theta} = M'A/K_m$$

(16)

and $$\theta = M'/K_m \int_t A dt = (M'/K_m) V.$$

(17)

One of the details necessary to obtain precision performance may be better understood with reference to FIG. 8–11. The pole shoes 112 are made with a skew angle $\theta_2$ to compensate for the fact that the inductive drag force resulting from the movement of a rectangular tube of magnetic flux, such as defined by the cross-hatched areas of FIG. 10, is greater for movement broadside to the rectangular cross-section than it is for movement along the narrow direction of the cross-section.

Figure 11:
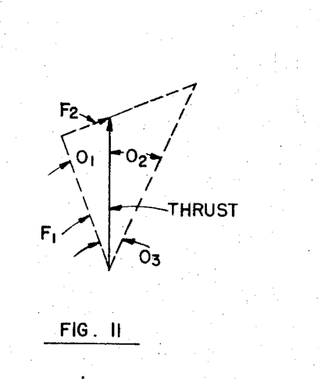
FIG. 11 is a vector diagram showing the relations between the field components in the embodiment of FIGS. 8 and 9.

Hence, to obtain a pure thrust inductive drag force on the proof mass, it is necessary to skew the magnet poles. A tangential induction drag force, shown as $F_2$ in FIG. 11, is thus obtained which, when added to the force $F_1$ induced broadside to the relative screw thread, will result in a pure thrust force on the proof mass.

From the description above it will be seen that a number of embodiments have been shown of the basic idea of providing measurable rotary and translational forces to restore a proof mass, which itself is limited to translational movement along one sensitive axis, to a null position, and utilizing the measurable rotary and translational forces as indicators of the values of accelerating forces to which the device is subjected to arriving at quantities such as velocity and distance used in computing navigational problems.

Although the invention has been described and illustrated to detail, it is to be clearly understood that the same is by way of illustration and example only and is not to be taken by way of limitation, the spirit and scope of this invention being limited only by the terms of the appended claims.

We claim:

1. In an integrating type of device for measuring accelerations, the combination of: a housing a cylindrical proof mass of non-magnetic, electrically conductive material; positioned within and longitudinally with respect to said housing; bearing means, positioned in said housing for permitting frictionless translation of said proof mass parallel to the cylindrical axis thereof, while restraining movement of said proof mass transversely of said axis, said bearing means positioned in close proximity to the surface of said proof mass; means mounted on said housing adjacent one end of said proof mass, for sensing axial displacements due to accelerations of said proof mass; means for restoring said mass to null position after axial displacement, comprising rotating magnetic means for setting up magnetic fields travelling axially of said proof mass for inducing currents in said proof mass in such a direction as to produce magnetomotive restoring axial forces equal and opposite to those producing such translations, said restoring means comprising a pair of magnets mounted on said housing with their opposed poles adjacent the outer surface of said proof mass; and means for measuring the restoring forces necessary to balance the axial forces due to said accelerations as a function of the speed and number of revolutions of said rotating magnetic means for producing said induced currents.

2. In a device for utilizing inertial effects in the measurement of quantities used in navigation, the combination of: a housing; motor means disposed within said housing; magnetic field means disposed within said housing and arranged to create a uniform field across a space central thereof; flux distributing means fixed to the shaft of said motor means and extending within the central space of said magnetic field means; said flux distributing means and said magnetic field means being adapted to produce varying flux concentrations along the rotational axis of said distributing means, and translation of the positions of said concentrations along said axis when said distributing means are rotated by said motor means; a non-magnetic electrically conductive cylindrical proof mass disposed proximate to said flux distributing means; hydrodynamic bearing means supporting said proof mass for rotation about the axis of rotation of said flux distributing means and within said uniform magnetic field, and for translation axially of said field; means for sensing such axial translation; servo means responsive to said sensing means for varying the speed of rotation of said flux distributing means to produce magnetic forces in said proof mass tending to restore said mass axially to null position after any translation therefrom; and means for acting as an indication of the accelerations to which said device has been subjected.

3. The combination, in a device for utilizing inertial effects in the measurement of quantites used in navigation, of: a housing; motor means disposed within said housing; magnet means disposed within said housing helical flux distributing means disposed within said magnetic means to provide a magnetic flux density having a helical array whereby magnetic lines of forces are set up through a central field space in a helical pattern; said helical flux distributing means being disposed for rotation by said motor means about the axis of revolution of said flux distributing means through said central field space; said flux distributing means being arranged to cooperate with said magnet means to create axially varying flux density concentrations across said central field space within said magnet means, said concentrations traveling axially when said distributing means are rotated; a cylindrical non-magnetic electrically conductive proof mass disposed for rotation about the axis of rotation of said flux distributing means and for translation parallel to the axis thereof; pressure means for producing hydrodynamic bearing surfaces within and without said proof means; means for sensing translational movement of said proof mass; means responsive to said sensing means for correctively controlling the rotation of said motor means to initiate axial forces for restoring said proof mass to null position after any deflection thereof; and means for measuring the accelerations experienced.

4. An integrating accelerometer, comprising a proof mass floated by hydrodynamic bearing means for rotation about, and translation along, a sensitive axis; a first helical gear adapted to act as an induction drag disk fixed about said proof mass; magnetic means having a narrow gap disposed about opposite edge portions of said drag disk gear; a second helical gear meshing with said first helical gear and having motor means arranged in driving relation thereto; means, positioned adjacent to the end of said proof mass, for sensing translation of said proof mass along said sensitive axis; servo circuit means said translation sensing means, and, said motor, for correctively control the speed of said motor means; whereby axial translation of said proof mass results in position restoring speed changes in said motor means; and means for determining the total value of corrective action required for each acceleration-produced displacement of said proof mass.

5. An integrating accelerometer comprising a support; a proof mass; means mounting said proof mass to said support for rotation about a selected axis and for translational motion constrained to a direction parallel to said axis; pickoff means on said support for sensing translational displacement of said proof mass relative to said support, rotatable means responsive to said pickoff means on said support for developing a torque acting about said axis; means including said rotatable means for applying said torque to said proof mass and concomitantly applying to said proof mass a balancing force proportional to said translational displacement and exerted in a direction opposite to said direction of translational displacement.

6. In an instrument for measuring accelerating forces, the combination of: a housing; a proof mass mounted within said housing for rotation solely about a single axis and having a null position therealong; means, comprising a bearing positioned in said housing, for supporting said proof mass for translational displacement solely along said single axis; rotating force means mounted on said housing for providing skewed tangential forces acting upon said proof means for restoring said proof mass linearly to null position; and means, comprising a counter, for measuring the extent of movement of said rotating means in restoring said proof mass to null position.

7. In a device for measuring acceleration, the combination of: a base; a cylindrical proof mass of electrically conductive material; bearing means for mounting said proof mass to said base for translation parallel to the longitudinal axis of said proof mass; transducer means for sensing translation of said proof mass along said longitudinal axis relative to said base; means to provide for rotation of a magnetic field about said longitudinal axis of said proof mass, and axially traveling therealong relative to said base, said magnetic field being of constant intensity and normal to said longitudinal axis; said proof mass being disposed within said rotating magnetic field; control means for controlling the rotation of said magnetic field responsively connected to said transducer means wherein the rotation and axial translation of said magnetic field means are functions of such translational displacement of said proof mass, and whereby the inertial forces applied to the proof mass by such axial accelerations are balanced by an axial component of the magnetomotive forces induced by the rotation and translation of the first mentioned field.

8. In an acceleration responsive device, the combination of: a housing having a longitudinal axis; an elongate container positioned in said housing concentric with said axis; a proof mass formed of electrically conductive non-magnetic material; means mounting said proof mass within said container for rotation relative thereto about a sensitive axis and for translational displacement along said axis; magnetic means, comprising a pair of magnets, for providing a uniform magnetic field through said proof mass and normal to said sensitive axis thereof; said magnetic means being positioned transversely relative to the longitudinal axis of said housing and rotatable about the sensitive axis of said proof mass; first rotational means, mounted on said housing for rotating said uniform field about said proof mass; helical array means, mounted on said container, for providing concentration of said magnetic field in a helical pattern about said proof mass, said array being disposed between said magnetic field means and said proof mass for rotation about the sensitive axis of said proof mass; second rotational means, mounted on said housing, for providing independent rotation about said proof mass of said helical array; displacement detecting means, mounted on said housing, for detecting displacements of said proof mass along said sensitive axis; servo means responsive to said displacement means, connected between said detecting means and said rotation means, for controlling the rotations of said first and second rotational means relative to each other as functions of the displacements so detected; whereby said relative rotations induce eddy currents in said proof mass in directions to produce axial magnetomotive forces thereon tending to restore said proof mass to a null axial position.

9. In an acceleration responsive device, the combination of: a supporting housing; a proof mass chamber supported for rotation in said housing; a non-magnetic electrically-conducted cylindrical proof mass positioned in said chamber; motor means fixed to said housing for rotating said chamber; fluid means, disposed in said chamber, for supporting and driving said proof mass therein for non-deflectional rotation about and translation along a sensitive axis; means, fixed to said housing, for maintaining the pressure of said fluid in said chamber substantially constant; magnetic means, comprising a magnet positioned transverse to the axis of said proof mass, for setting up a transverse magnetic field through said proof mass and normal to the longitudinal axis thereof; helical flux distributing means disposed between said proof mass and said magnetic means for providing helical magnetic flux distribution of said magnetic field about said proof mass; rotational means, fixed to said housing, for rotating said transverse magnetic field means and said flux distributing means relative to each other and relative to said proof mass; means, fixed to said housing, for detecting displacement of said proof mass along said sensitive axis, said rotational means being responsive to said displacement detecting means whereby eddy currents may be induced in said proof mass in such sense that the magnetic fields produced by such eddy currents will produce magnetomotive forces tending to restore said proof mass axially to null position.

10. In a device for sensing accelerations: a supporting housing; a proof mass housing rotatably supported thereon; a non-magnetic electrically conductive proof mass disposed in said proof mass housing for translation along and rotation about a rotational axis of said proof mass without deflection normal to the axis of rotation; fluid bearing means, positioned adjacent said proof mass, for supporting said proof mass within said proof mass housing; magnetic field means, positioned transversely by said axis of said proof mass for setting up a constant magnetic field transversely through said proof mass and normal to the rotational axis thereof, said magnetic field means being rotatable about the rotational axis of said proof mass; flux distributing means rotatable relative to said magnetic field means and independently rotatable relative to said proof mass for providing a localized magnetic flux density pattern of said magnetic field extending about and moving axially of said proof mass said flux distributing means being positioned adjacent said proof means; sensing means, positioned adjacent said proof means, for sensing axial translation of said proof mass relative to said support housing; servo means responsive to said sensing means for rotating said magnetic field means and said flux distributing means to induce axial magnetomotive force components in the proof mass tending to restore said proof mass axially to null position; and means for counting the number of rotations required to restore said proof mass to said null position.

11. An integrating accelerometer comprising: a magnet having at least two unlike poles closely spaced to define a gap; an electrically conductive non-magnetic disc-shaped proof mass member partially extending into said gap and arranged for translational deflection along and rotation about an axis of revolution parallel to the direction of the magnetic field in said gap, whereby upon rotation of said proof mass member an eddy current drag torque proportional to the rotational velocity of the member is induced in said proof mass member in such sense as to oppose such rotation; servo motor rotational means operatively coupled to said proof mass member for applying rotational and axial force components thereto; pickoff means for sensing axial translation of said proof mass along said axis of revolution relative to said magnet, said servo means being responsively connected to said pickoff means for controlling the rotation of said proof mass member in a sense to apply an axial restoring force to said proof mass member simultaneously with such rotation.

12. An integrating accelerometer comprising: a base; magnetic means, fixed to said base and having a close gap, for setting up thereacross a magnetic field of relatively high flux density; an electrically conductive non-magnetic proof mass member extending into said gap; bearing means mounting said proof mass member to said base for rotation about and translation along an axis parallel to the magnetic field whereby upon such rotation a drag torque proportional to rotational velocity is generated; pickoff means for sensing translational displacement of the proof mass member; a servo motor; fixed to said base helical gear means operatively coupling said motor to said proof mass member for rotating said proof mass member and imposing axial forces upon said proof mass member proportional to the drag torque opposing such rotation means, responsively connecting said servo motor and said pick-off means, for causing said servo motor to rotate said proof mass member through said helical gear in a sense to reduce said translational displacement.

13. In an integrating type of device for measuring accelerations the combination of: a housing; an annular stator disposed therein; pump means disposed centrally therein; annular pressure-fed bearing means disposed for rotation within said housing about said pump means; thin-walled rotor means integral with said bearing means and extending radially and annularly into operative relation with said stator; a cylindrical electrically-conductive non-magnetic proof mass concentrically disposed only for rotation about and translation along the rotational axis of said bearing means, the cylindrical surface of said proof mass being pierced to define skewed slots separating a plurality of electrically conductive bars skewed relative to the axis of rotation of said proof mass; servo means for electrically energizing said stator to induce rotational forces in said thin-walled rotor and said bearing means whereby fluid coupling action between said bearing means and said proof mass may induce rotation of said proof mass; magnetic field means fixed to said housing for providing a magnetic field extending transversely relative to the rotational axis of said proof mass; first sensing means, fixed to said housing, for sensing translation of said proof mass relative to said housing means, responsively connecting said servo means to said first sensing means, for providing control of the rotation of said rotor means to produce an axial magnetomotive force component tending to restore said proof mass to a translational null position; second sensing means, fixed to said housing, for sensing rotations of said proof mass as a measure of the velocity along said rotational axis to which said device is subjected.

14. In a device for measuring velocity by inertial means, the combination of: a housing; a motor disposed within said housing, a helical flux concentrating member fixed to said motor means whereby said helical flux concentrating member rotates about the axis of revolution of such helical member, cylindrical enclosure means positioned concentric with and sealingly surrounding said helical flux concentrating member; a cylindrical non-magnetic electrically conductive proof mass member positioned concentric with and surrounding said enclosure means; magnetic means concentrically disposed about said proof mass member for providing therethrough a uniform magnetic field fixed relative to said housing and extending transversely with respect to the rotational axis of said helical member; hydrodynamic bearing means operable both internally and externally of said proof mass for mounting said proof mass for rotation about and translation along a sensitive axis coincident with the axis of rotation thereof and relative to said housing; first sensing means fixed for said housing for sensing such translation, servo means for energizing said motor means to provide an axially moving helical magnetic flux concentration through said proof mass member, said servo means being responsively connected to said first sensing means whereby said servo means provides control of the rotation of said helical flux concentrating member to produce an axial magnetomotive force tending to resist translation of said proof mass member along said axis of rotation from an axial null position; second sensing means fixed to said housing for sensing the rotation of said motor means whereby said second sensing means acts as a measure of the accelerations along said rotational axis to which said device is subjected.

15. A support, a proof mass, means mounting the proof mass to the support for translation and rotation relative to the support along and about a sensitive axis, a pickoff fixed to said support for sensing translational displacement of the proof mass relative to the support, rotary means fixed to said support and responsively connected to said pickoff means for exerting a torque upon said proof mass, and means including said rotary means and said proof mass for exerting upon the proof mass a translational force in a sense to null displacement sensed by said pickoff.

16. A support, a proof mass, means mounting said proof mass to said support for translation relative to the support along a sensitive axis, a pickoff fixed to said support for sensing translational displacement of the proof mass relative to the support, and rotatable means fixed to said support and responsively connected to said pickoff for generating a translating force along said axis and cooperating with the proof mass to oppose displacement sensed by said pickoff.

17. First and second members mounted for translational motion relative to one another upon application of a force to one of said members along a sensitive axis in the direction of said relative motion, said first member comprising an electrically conductive element, means including said second member for providing in said first member a constant magnitude magnetic field movable relative to said first member in a direction parallel to said sensitive axis, and means for limiting relative displacement of said members comprising means for controlling motion of said field relative to the first member so as to produce an induced translational eddy current force acting in opposition to said applied force.

18. A support, a proof mass mounted to the support for translation relative to the support along a sensitive axis, means fixed to said support for detecting translational displacement of the proof mass relative to the support, and means responsive to said detection means and cooperating with said proof mass for generating translational eddy current induced forces acting along said axis upon said proof mass in a sense to reduce said detected displacement.

19. A support, a first structure mounted to the support for translation along a sensitive axis, a second structure including a part mounted to said support for rotation about said axis, one of said structures comprising an electrically conductive element, the other of said structures comprising means for producing a magnetic field traveling along said axis relative to and extending about said one structure to generate eddy currents therein, and means responsive to translational displacement of the first structure for controlling rotation of said part of the second structure and causing said magnetic field to induce translational eddy current forces acting upon said first structure to null said displacement thereof.

\* \* \* \* \*